US009082309B1

(12) United States Patent
Fuka

(10) Patent No.: US 9,082,309 B1
(45) Date of Patent: Jul. 14, 2015

(54) DYNAMIC QUESTION TEMPLATE SYSTEM AND ARCHITECTURE

(71) Applicant: Querium Corporation, Austin, TX (US)

(72) Inventor: Kent Allen Fuka, Austin, TX (US)

(73) Assignee: Querium Corporation, Austin, TX (US)

( * ) Notice: Subject to any disclaimer, the term of this patent is extended or adjusted under 35 U.S.C. 154(b) by 0 days.

(21) Appl. No.: 14/209,855

(22) Filed: Mar. 13, 2014

Related U.S. Application Data

(60) Provisional application No. 61/794,703, filed on Mar. 15, 2013.

(51) Int. Cl.
*G09B 7/00* (2006.01)

(52) U.S. Cl.
CPC .................... *G09B 7/00* (2013.01)

(58) Field of Classification Search
CPC ........................................... G09B 7/00
USPC .................. 434/322, 323, 336, 350
See application file for complete search history.

(56) References Cited

U.S. PATENT DOCUMENTS

| | | | |
|---|---|---|---|
| 6,554,618 B1 | 4/2003 | Lockwood | |
| 6,634,887 B1 | 10/2003 | Heffernan, III et al. | |
| 6,988,895 B1 | 1/2006 | Lamarche et al. | |
| 2002/0127521 A1 | 9/2002 | Fegan | |
| 2002/0184265 A1* | 12/2002 | Gupta | 707/513 |
| 2006/0199163 A1* | 9/2006 | Johnson | 434/322 |
| 2006/0240394 A1 | 10/2006 | Smith | |
| 2007/0269788 A1 | 11/2007 | Flowers et al. | |
| 2008/0307320 A1* | 12/2008 | Payne et al. | 715/751 |
| 2010/0081120 A1* | 4/2010 | Nanjiani et al. | 434/322 |
| 2012/0034583 A1* | 2/2012 | Dujowich et al. | 434/219 |
| 2013/0017527 A1 | 1/2013 | Nguyen et al. | |
| 2013/0084554 A1* | 4/2013 | Shah et al. | 434/359 |
| 2013/0196305 A1* | 8/2013 | Adir et al. | 434/322 |

OTHER PUBLICATIONS

Ngspice Circuit Simulator—Related Applications, 2 pages, downloaded on Feb. 19, 2013, at http://ngspice.sourceforge.net/relapp.html.

Mauch, Sean, Welcome page for version 1.9 of Cain—Chemical Simulator, 1 page, Center for Advanced Computing Research, California Institute of Tech., Pasadena, CA, downloaded on Feb. 19, 2013, at http://www.cacr.caltech.edu/~sean/cain/Welcome.htm.

(Continued)

*Primary Examiner* — Bruk Gebremichael
(74) *Attorney, Agent, or Firm* — Sprinkle IP Law Group

(57) ABSTRACT

Embodiments can dynamically generate questions useful for student evaluation. One embodiment of a method may include providing a user interface on a client device for a user to compose a dynamic question template (DQT) in a first representation. The DQT which may have a question, question variables, a correct answer, and question constraints may be received by a system running on one or more server machines. The system may compile the DQT and generate and store a DQT object in an object library. The system can then pre-generate or dynamically generate in real time a plurality of unique question variants using the DQT object and without further input from the user. In generating the unique question variants, the system may obtain values, as constrained by the question constraints, for the question variants and/or run simulations using other objects such as equations from the object library or libraries.

30 Claims, 13 Drawing Sheets

(56) References Cited

OTHER PUBLICATIONS

Jones, M. Tim, Open Source Physics Engines, Jul. 7, 2011, 12 pages, IBM Corporation, Armonk, NY, available at http://public.dhe.ibm.com/software/dw/opensource/os-physicsengines/os-physicsengines-pdf.pdf.

MyLabs Plus, MyMathLab and MyStatLab Quick Start Quide for Instructors, Jul. 2012, 32 pages, Pearson Education, Upper Saddle River, NJ, downloaded Mar. 18, 2013, at http://help.pearsoncmg.com/xl/get_started/instructor/mmnd/mml/get_started_instr_mmnd_mml.pdf.

Learn about MathXL, 2012, 1 page, Pearson Education, Upper Saddle River, NJ, downloaded on Mar. 18, 2013, at http://mxlmkt.pearsoncmg.com/learn-about.

MathXL Features, 2008, 3 pages, Pearson Education, Upper Saddle River, NJ, downloaded on Mar. 18, 2013, at http://www.mathxl.com/support/features.htm.

MapleTA, Web-based Testing and Assessment for Math Courses, 2013, 2 pages, Maplesoft, Waterloo, ON, Canada, downloaded on Mar. 18, 2013, available at http://www.maplesoft.com/products/mapleta/.

Maple T.A. User Guide, 2011, 354 pages, Maplesoft, Waterloo, ON, Canada, downloaded on Mar. 18, 2013, at http://www.maplesoft.com/view.aspx?SF=130846/430811/MapleTAUserGuide.pdf.

WebAssign Online Homework and Grading, How it Works, 1 page, North Carolina State University, Raleigh, NC, downloaded on Mar. 18, 2013, at http://www.webassign.net/how_it_works/.

WebAssign Online Homework and Grading, Create Your Own Questions, 1 page, North Carolina State University, Raleigh, NC, downloaded on Mar. 18, 2013, at http://www.webassign.net/features/create_your_own_questions.html.

WebAssign Instructor Guide, Mar. 2013, 516 pages, North Carolina State University, Raleigh, NC, downloaded on Mar. 18, 2013, at http://www.webassign.net/manual/WebAssign_Essentials.pdf.

Wiley PLUS Student User Guide, 32 pages, John Wiley & Sons, Inc., Hoboken, NJ, downloaded on Mar. 18, 2013, at http://www.physics.nus.edu.sg/~phytaysc/pc1221_07/Student%20User%20Guide.pdf.

Wiley PLUS Creating Your Own Questions, 1 page, John Wiley & Sons, Inc., Hoboken, NJ, downloaded on Mar. 18, 2013, at http://www.wiley.com/college/twomin/ins/addingquestions.html.

Wiley PLUS Instructor User Guide, 39 pages, Wiley PLUS, downloaded on Mar. 18, 2013, at http://Irdudc.wrlc.org/cat/quick-guides/wiley-plus.pdf.

What Makes ALEKS Unique, 2012, 9 pages, Aleks Corporation, Irvine, CA, downloaded on Mar. 18, 2013, at http://www.aleks.com/about_aleks/What_Makes_ALEKS_Unique.pdf.

Respondus 4.0 User Guide for Platform-Neutral Personality, Mar. 2010, 46 pages, Respondus, Inc., Redmond, WA, downloaded on Mar. 18, 2013, at http://www.respondus.com/downloads/Respondus40UserGuidePN.doc.

EdReady, Powered by NROC, 2013, Monterey Institute for Technology and Education, downloaded on Mar. 11, 2014 at http://edready.org/.

ALEKS—Assessment and Learning, K-12, Higher Education, Automated Tutor, Math, downloaded on Mar. 11, 2014, at http://www.aleks.com/.

MathXL Highlights, Rotating Content, 2008, 2 pages, Pearson Education, Upper Saddle River, NJ, downloaded on Mar. 11, 2014, at http://www.mathxl.com/.

MyLab and Mastering, MyMathLab, 5 pages, Pearson Education, Upper Saddle River, NJ, downloaded Mar. 11, 2014, at http://www.pearsonmylabandmastering.com/northamerica//index.html.

Quest Learning & Assessment, 2014, 1 page, The University of Texas at Austin, College of Natural Sciences, Austin, Texas, downloaded Mar. 11, 2014, at https://quest.cns.utexas.edu/.

Office Action for U.S. Appl. No. 14/210,040, mailed Jul. 14, 2014, 10 pg.s.

Office Action for U.S. Appl. No. 14/210,040, mailed Jan. 20, 2015, 14 pgs.

* cited by examiner

Edit Question 2

Home > Kent's Questions > Edit Question  Edit Question #23  Welcome, Kent Fuka  Logout

Question Template
602 — A(n) Vehicle leaves City1 at StartTime headed towards City2, traveling at Velocity1. At the same time, a(n) Vehicle leaves City2 headed towards City1 at Velocity2. If the distance between the two cities is Distance, at what time do the two Vehicle(s) meet (to the nearest minute)?

Question Options
Question Type: Multiple Choice
Number of Choices: 4
Manage Hints | Manage Distractors

Question Variables
604 —
| Name | Is A |
|---|---|
| City | NorthAmericanMajorCity |
| Distance | City1 DistanceTo: City2 |
| StartTime | MinuteAccurateTimeWithoutTimezone |
| Vehicle | LandPassengerTransportationVehicle |
| Velocity | Vehicle TypicalVelocity |

Question Constraints — 606
| Item A | Operation | Item B |
|---|---|---|
| City1 DistanceTo: City2 | >= | 500 km |
| Solution | RoundTo | 0 |
| Vehicle MaximumVelocity | >= | 100 km/h |
| Velocity | DivisibleBy | 5 km/h |

Solution Equations
608 — Solution = (Distance / (Velocity1 + Velocity2))*[MinutesPerHour] + StartTime

Generated Question Example
610 — A bus leaves Denver at 3:15AM headed towards Phoenix, traveling at 110 km/h. At the same time, a bus leaves Phoenix headed towards Denver at 105 km/h. If the distance between the two cities is 943 km, at what time do the two buses meet (to the nearest minute)?

☑ A: 7:38AM  ☐ B: 7:48AM  ☐ C: 7:38PM  ☐ D: 4:23AM

Show Me Another Example | Cancel | Save

STATIC VARIANT #1
PROBLEM STATEMENT: A NEIGHBORHOOD REC CENTER HAS A BASKETBALL COURT THAT IS 84 FEET LONG AND 50 FOOT WIDE, THE CENTER WANTS TO BUILD A SECOND BASKETBALL COURT, BUT SPACE IS LIMITED. IF THEY BUILD A BASKETBALL COURT THAT IS 43 FEET WIDE, HOW MANY FEET LONG MUST IT BE SO IT IS SIMILAR IN SHAPE TO THE ORIGINAL BASKETBALL COURT? ROUND YOUR ANSWER TO THE NEAREST TENTH OF A FOOT.
SOLUTION VALUE: 72.2 FEET
DISTRACTOR #1 VALUE: 83.1 FEET
DISTRACTOR #2 VALUE: 77.0 FEET
DISTRACTOR #3 VALUE: 97.7 FEET
CORRECT ANSWER EXPLANATION: SIMILAR FIGURES HAVE THE SAME RATIO FOR EACH PAIR OF CORRESPONDING SIDES. MAKE A RATIO OF THE TWO WIDTHS $\frac{43}{50}$, AND MULTIPLY THIS BY THE LENGTH, 84 FEET, IN ORDER TO DETERMINE HOW LONG THE SMALLER SIMILAR COURT MUST BE.

DISTRACTOR #1 EXPLANATION: YOU DID NOT USE THE RATIO CORRECTLY. INSTEAD OF SUBTRACTING IT FROM THE LENGTH OF THE FULL COURT, YOU SHOULD MULTIPLY THE RATIO AND THE LENGTH OF THE FULL COURT.

DISTRACTOR #2 EXPLANATION: YOU MUST FIND THE RATIO OF THE WIDTHS, WHICH INVOLVES DIVIDING THE SMALLER WIDTH BY THE LARGER AND MULTIPLYING BY THE LENGTH, NOT ADDITION AND SUBTRACTION.

DISTRACTOR #3 EXPLANATION: THE RATIO YOU NEED IS $\frac{43}{50}$, BUT YOU INCORRECTLY USED THE INVERSE. THE LENGTH OF THE PRACTICE COURT NEEDS TO BE SMALLER THAN THE LENGTH OF THE ORIGINAL COURT.

GENERAL HINT #1 EXPLANATION: DETERMINE THE RATIOS OF THE WIDTHS AND THE LENGTHS.
GENERAL HINT #2 EXPLANATION: DOES YOUR ANSWER MAKE SENSE? IS THE LENGTH OF THE PRACTICE COURT SMALLER THAN THE LENGTH OF THE ORIGINAL COURT?

STATIC VARIANT #2
PROBLEM STATEMENT: A NEIGHBORHOOD REC CENTER HAS A BASKETBALL COURT THAT IS 84 FEET LONG AND 50 FEET WIDE. THE CENTER WANTS TO BUILD A SECOND BASKETBALL COURT, BUT SPACE IS LIMITED. IF THEY BUILD A BASKETBALL COURT THAT IS 39 FEET WIDE, HOW MANY FEET LONG MUST IT BE SO IT IS SIMILAR IN SHAPE TO THE ORIGINAL BASKETBALL COURT? ROUND YOUR ANSWER TO THE NEAREST TENTH OF A FOOT.
SOLUTION VALUE: 65.5 FEET
DISTRACTOR #1 VALUE: 83.2 FEET
DISTRACTOR #2 VALUE: 73.0 FEET
DISTRACTOR #3 VALUE: 107.7 FEET

DYNAMIC QUESTION TEMPLATE SYSTEM AND ARCHITECTURE

CROSS REFERENCE TO RELATED APPLICATION(S)

This application is a conversion of, and claims a benefit of priority from, U.S. Provisional Application No. 61/794,703, filed Mar. 15, 2013, entitled "DYNAMIC QUESTION TEMPLATE SYSTEM AND ARCHITECTURE. This patent application also relates to U.S. patent application Ser. No. 14/210,040, filed Mar. 13, 2014, entitled "EXPERT SYSTEMS AND METHODS FOR DYNAMIC ASSESSMENT AND ASSESSMENT AUTHORING," which is a conversion of and claims a benefit of priority from U.S. Provisional Applications No. 61/801,445, filed Mar. 15, 2013, entitled "EXPERT AGENTS FOR DYNAMIC TEST AUTHORING" and No. 61/802,215, filed Mar. 15, 2013, entitled "EXPERT ASSESSMENT AUTHORING SYSTEM AND ARCHITECTURE." All applications listed in this paragraph are hereby incorporated by reference in their entireties for all purposes as if fully set forth herein.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

TECHNICAL FIELD

This disclosure relates generally to online education software and services. More particularly, embodiments disclosed herein relate to a dynamic question template system and architecture useful for implementing online education services. Even more particularly, embodiments disclosed herein relate to a system, method, and computer program product for the assessment of students through online systems for self-practice, homework, quizzes, exams and certification tests, useful for educational testing, professional certification exams, and student practice systems.

BACKGROUND

Modern online assessment systems need to generate a plurality of similar, unique questions for multiple students both to reduce the possibility of cheating when students share answers to questions and to provide a basis for student drilling or practicing.

To create the plurality of unique question variants, online assessment systems require that question authors generate a question template from which a plurality of similar, unique question variants can be produced. This question authoring effort can lead to large amounts of programming effort on the part of question authors as well as requiring substantial subject matter expertise. For problems that involve real-world information, this programming task can be even more complicated due to the need for a question template to include a wide variety of real-world data necessary to produce the plurality of unique questions. Previous solutions required a question author to create each question template from scratch. Multiple question templates could not share a common library of code, or a common library of real-world facts and information.

Previous online assessment systems that do not employ templates require a large number of very similar unique static questions, with one similar static question chosen at random to be delivered to a student taking an assessment test. In any case, a question author (who authors question templates or static questions) had to copy and paste a large amount of logic and data between similar static questions or question templates.

SUMMARY OF THE DISCLOSURE

Embodiments can dynamically generate questions useful for student evaluation. One embodiment of a method may include receiving, by a system running on one or more server machines, one or more questions posed to students accessing the system from a client device. Each question may have one or more associated constraints between the variable pieces of information within the question template (Variable Constraints). The question(s) may be in a question specification language understood by the system. The system may compile a question into a different computer language or representation and generate a dynamic question template based at least in part on the compiled question and the one or more associated Variable Constraints. In real time, the system can dynamically generate a plurality of unique question variants using the dynamic question template.

In some embodiments, the dynamic question template may include one or more predefined objects from a common equation library. In some embodiments, one or more quality assurance tools may be used to determine if the question is correct, whether a reasonable number of unique question variants can be generated, and/or whether a reasonable number of multiple choice answers can be generated. In some embodiments, the method may further include determining a number of available unique question variants that may be generated based on the compiled question based on the one or more associated Variable Constraints. In some embodiments, the method may further comprise providing one or more hints associated with the question to a system user (student, instructor or question author) at the client device.

One embodiment comprises a system for dynamic question template generation. The system comprises a processor and a non-transitory computer-readable storage medium that stores computer instructions translatable by the processor to perform a method substantially as described herein. Another embodiment comprises a computer program product for dynamic question template generation. The computer program product comprises a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 6 depicts an example of a graphical user interface for composing dynamic question templates;

FIG. 7 depicts a graphical user interface including objects for composing dynamic question templates;

FIG. 8 depicts an example html preview of generated questions;

FIG. 11A-FIG. 11E illustrate example hints to student users according to some embodiments.

DETAILED DESCRIPTION

Figure 1:
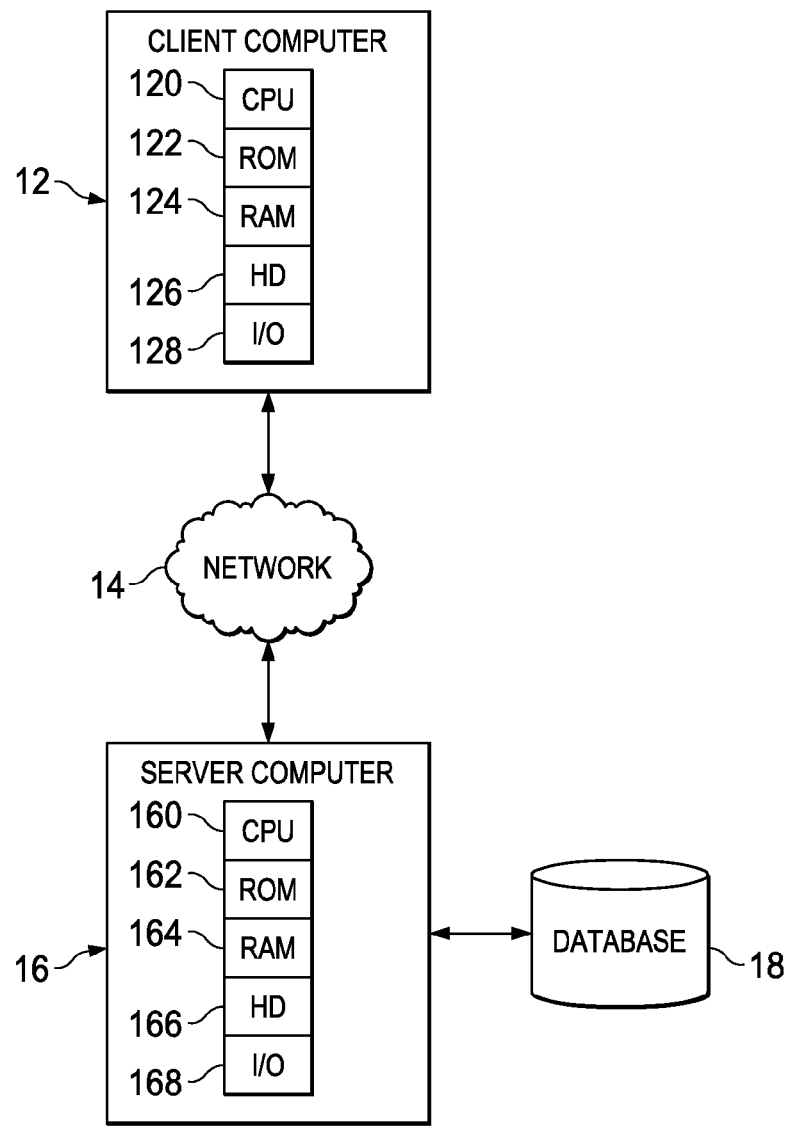
FIG. 1 depicts an example of a hardware architecture where embodiments disclosed herein can be implemented.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein provide a new and unique solution to question authoring. The solution enables a question author to create unique question variants (UQV) through creating a 'dynamic question template' (DQT) based on an object-oriented programming (OOP) approach, bringing the benefits of object-oriented design to the creation of assessment questions. The inventive solution provides an object library framework for use by DQT authors.

This object framework can streamline the development of DQTs in several ways. First, each DQT can be treated as a software application, in which the object library acts as a runtime library. This feature can streamline the creation of DQTs by allowing the DQT author to refer to a single common piece of question template logic within a number of similar DQTs. For example, the library can include facts about electronic components when used to create questions for a college course in electrical engineering (EE). The equations for solving EE questions can be embedded within an object library, saving the DQT author from having to include the calculations within the DQT itself. The library could further include math equations or solutions to math equations for use in math instruction. For example, the library could include solutions to the quadratic equation or the Pythagorean Theorem and the like.

Second, the invention object library can also act as a built-in object-database of real-world facts that can be used within DQTs. The real-world data in this object library may be referenced by the author in creating DQTs, saving the author the work of explicitly including this information within the programming of each DQT. The inventive object library provides a set of possible real-world values for the objects in the library. For example, for a library of U.S. City Names, the object library can contain information such as the longitude and latitude of the city, its population, and its founding date, etc. A single DQT can then generate a large number of unique questions that refer to information about a US City without requiring the DQT author to add this information explicitly to their DQT. In this way, the assessment system can give Student #1 a question about New York, whereas Student #2 is given a question about Miami.

Embodiments disclosed herein can provide many advantages. For example, embodiments can save time for DQT authors by reducing the complexity of the logic they must include in their DQTs. Embodiments can also improve the reliability of DQTs by allowing for software re-use, since common functions are encapsulated within library objects. A single copy of the library software can be referenced by multiple DQTs. This avoids the need for multiple copies of the same code across a number of DQTs. Any error in the logic of a library object needs to be corrected only in a single place. Similarly, any enhancement to a library object is immediately available to all DQTs that reference that object, speeding the release of corrections to the users of the assessment system. By streamlining the inclusion of real-world data in DQTs, embodiments promote the creation of dynamic questions that have a greater variety of possible generated variants, which reduces the likelihood of student cheating.

Before discussing example embodiments of the invention, a hardware architecture where embodiments disclosed herein can be implemented is described. FIG. 1 illustrates an exemplary architecture and includes a client computer 12 that is bi-directionally coupled to a network 14, and a server computer 16 that is bi-directionally coupled to the network 14 and database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168 similar to corresponding items in client computer 12.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. These memories may be internal or external to the computers 12 and 16.

The client computer 12 may be a personal computer, tablet computer, smart phone or other user device. In various embodiments, a client computer 12 may be employed by a DQT author, an instructor, or a student. In particular, as will be explained in greater detail below, a client computer 12 may be used by a DQT author or instructor to generate question templates in accordance with embodiments. A client computer 12 may likewise be used by an instructor to or administrator to administer an exercise system. Finally, a client computer 12 may be utilized by a student to perform exercises.

In various embodiments, the server computer 14 may be a premises-based server computer or may be one or more cloud-based computers and may implement an exercise system and/or dynamic exercise middleware. As will be explained in greater detail below, the database 18 may store questions, templates, records of student responses, and the like.

Figure 2:
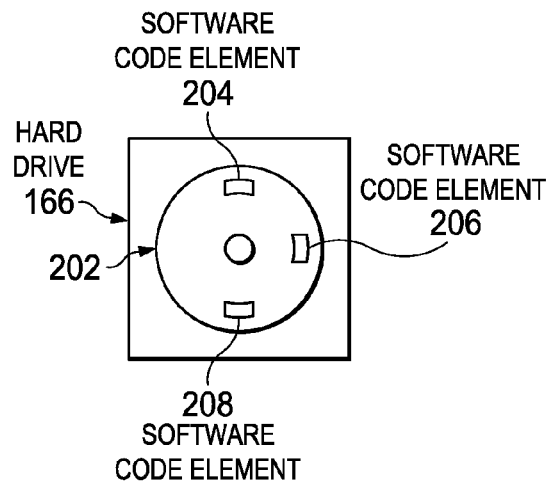
FIG. 2 depicts a diagrammatic representation of software code elements stored on an example non-transitory computer readable medium.

The methods described herein may be implemented in suitable software code that may reside within ROM 122 or 162, RAM 124 or 164, or HD 126 or 166. In addition to those types of memories, the instructions in an embodiment of the invention may be contained on a data storage device with a different data processing system readable storage medium. FIG. 2 illustrates a combination of software code elements 204, 206, and 208 that are embodied within a data processing system readable medium 202 on HD 166. Alternatively, the instructions may be stored as software code elements on a DASD array, magnetic tape, floppy diskette, electronic read-only memory, optical storage device, CD ROM or other appropriate data processing system readable medium or storage device.

Server machines like the server computer 16 described above may be used to implement an assessment system and client devices like the client computer 12 may be used by question authors to create questions or question templates for such an assessment system, by instructors to create tests, and by students to perform exercises and take tests.

Figure 3:
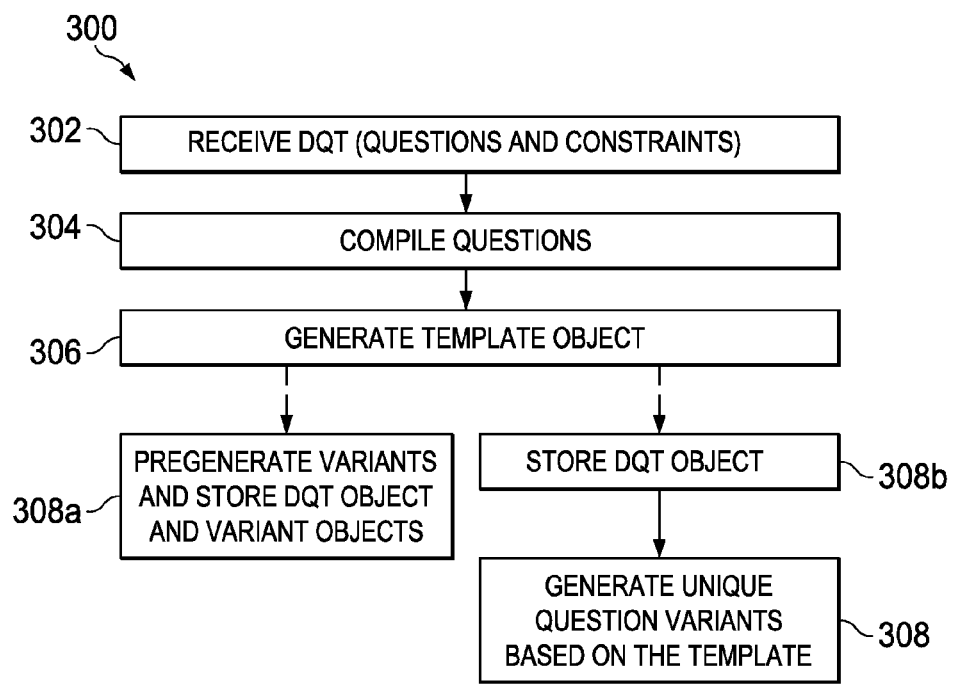
FIG. 3 depicts a flowchart illustrating operation of embodiments.

Turning now to FIG. 3, a flowchart illustrating operation of embodiments is shown and generally identified by the reference numeral 300. As shown, one or more questions, variables, and associated variable constraints of a Dynamic Question Template may be received at a computer such as server computer 16, typically over a network such as network 14 (step 302). As will be explained in greater detail below, in some embodiments, the Dynamic Question Template may be written in a Query Specification Language (QSL) and may be composed, for example, in a text editor or through use of a graphical user interface (GUI) by a user of a computer such as client computer 12. Depending on the embodiment, the Dynamic Question Template may then be checked, e.g., for syntax, and compiled and converted into internal formats, e.g., a machine-readable format or language used by a symbolic math engine such as Mathematica (step 304). Once this is done, the compiled question and constraints may be converted into a corresponding Dynamic Question Template object (step 306). In some embodiments, the DQT object can include one or more predefined objects, such as commonly-used equation objects, from an object library. In some embodiments, generating the DQT object can include determining if the constraints are reasonable or whether they will produce a reasonable number of unique question variants. In addition, some embodiments may suggest changes or other enhancements to the question. Depending on the embodiment, the process may proceed to process steps 308a or 308b. In step 308a, unique question variants are generated and stored in an object library (as will be discussed in greater detail below), either with or without the DQT object itself. Thus, in such an embodiment, one or more UQVs are pre-generated and easily accessible to a user. In other embodiments, however, the DQT object only is stored in the object library (step 308b). In this case UQVs may be generated on the fly at runtime based on the DQT object (step 308).

Figure 4:
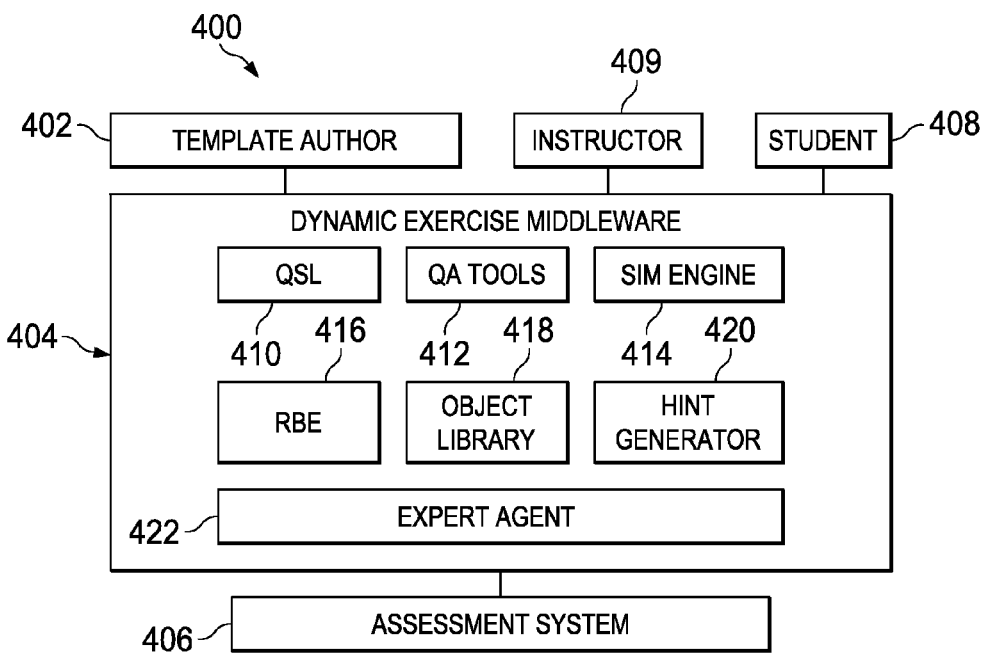
FIG. 4 depicts a diagrammatic representation of a dynamic question template system and architecture with object libraries

As noted above, and as illustrated in FIG. 4, a DQT author 402 may use the dynamic exercise system or dynamic exercise middleware (DEM) 404 to generate questions that are used by an assessment or dynamic exercise system 406 to present questions or exercises to a student user 408. The student user 408 of an assessment system (AES) 406 may undergo an online assessment by accessing the assessment system 406 via the dynamic exercise system 404 and answering a set of questions. Finally, an instructor 409, who may also be an author 402, may utilize the dynamic exercise system 404 to provide homework assignments, quizzes, and tests based on questions and exercises.

Embodiments may provide a middleware system and architecture that can decouple question authors from algorithmic assessment systems, freeing question authors from having to know various programming and formatting languages required by assessment systems. In one embodiment, the DEM 404 may include one or more translators and corresponding application programming interfaces (APIs) configured to communicate with various programming and formatting languages used by the dynamic exercise system 406. The DEM 404 may be communicatively connected to one or more internal and/or external data sources, as further described in detail below. The DEM 404 may provide a user interface (UI). A user (e.g., the DQT author 402, the instructor 409, the student 408, etc.) may access the assessment system 406 via a UI.

As mentioned above, in order to reduce the possibility of cheating when students share answers to questions, an online assessment system needs to generate a plurality of similar, unique questions. Such questions are similar and unique in that no two Unique Question Variants (UQVs) are identical to one another and yet they may follow the same or similar pattern or be generated from the same template. These unique question variants can allow the assessment system to test multiple students in a similar manner while reducing the possibility of cheating.

To create a plurality of unique question variants (UQVs), a DQT author 402 has to generate a question template from which the plurality of UQVs can be produced. Previous solutions required a question author to create each question template from scratch. Multiple question templates did not share a common library of embedded code. Question authors often have to embed several different specifications with a single question. For example, specification of the mathematics embedded in a question in Mathematica, may be in a different representation than specification of logic statements controlling the generation of the values in a unique question variant written in Perl. Furthermore, the representation for the formatting of a question on a user's screen or on a printed examination would require the knowledge of yet another special formatting language such as HTML or LaTeX. Advantageously, according to embodiments, a QSL is provided comprising a single question specification language, which removes from the Question Author the need to learn multiple languages like HTML or Mathematica in order to author questions.

In accordance with embodiments, a question template (DQT) created by a DQT author 402 can be evaluated by the DEM 404 to generate unique question variants. The DEM 404 may include one or more software modules that may enhance the question author's ability to build templates and author questions. These modules may include one or more of a Query Specification Language (QSL) 410, Quality Assurance Tools 412, Simulation Engines 414, Rules based Systems Engines 416, Object Library 418, and Hint Generation 420.

As will be discussed in greater detail below, the Query Specification Language module 410 supports a language that allows for authoring of questions and defining constraints. A resulting compiled question then specifies a template that may then be used for the generation of unique question variants based on the constraints.

The Quality Assurance Tools 412 assist in the generation of a question by checking to see if the question and specified constraints will generate a reasonable number of questions and also have reasonable answers.

The Simulation Engines 414 may be used to run simulations of the questions (e.g., equations) entered, for example, in a math system like Mathematica or MAPLE, or in a circuit simulator like Spice].

The Rules Based System Engine (RBE) 416 may analyze the state of the running system and, through subject matter knowledge of a tutor or an instructor, may be used to control the operations of other elements of the system. For example, the RBE 416 may perform step-by-step analysis of student work on a question in the system, or may offer praise to the student if they are making good progress on the last few questions, or encouragement to the student to keep trying if they have been struggling on the last few questions.

The Object Library 418 may be a predetermined or pre-loaded library of objects comprising DQT objects, UQV objects, as well as common questions or equations that a question author may access for easier generation of questions.

Hint Generator 420 may suggest to authors ways to obtain additional variants of questions or ways to make questions harder or easier to solve. The Hint Generator 420 may also offer hints to instructors on how to create better tests by combining questions. In addition, the Hint Generator 420 may also offer hints to students who need help with a question. Hints for students may be either stored by the question author within a DQT, or could be generated by the Hint Generator 420 on the fly based on the state of the system.

The Expert Agent(s) 422 may interact with the other modules of the DEM 404 to enhance the user (question author, instructor, student, etc.) experience. For example, some embodiments make intelligent decisions, e.g., on question quality, on step-by-step evaluation of student work on a question, for instructors in selecting questions to make up an exam, etc.

The DEM 404 may be implemented in various ways. The DEM 404 can operate in between template authors 402, students 408, and assessment system 406. The DEM 404 can simplify the work of a DQT author 402. For example, traditionally, to create an algorithmic exercise, a question author would write the question text, determine the variables, determine the variable constraints, write the equations which determine the correct answer for the question, and perhaps write one or more incorrect 'distractor' answers. With the DEM 404, a DQT author 402 may only need to write the question text or direct the DEM expert agent 422 to generate the question text. The rest of the functions can be performed by the DEM 404. Specifically, as an example, the DEM 404 may operate to perform determining and suggesting variables in a dynamic question template, determining and suggesting appropriate constraints for those variables, providing correct equation(s) to solve the question, and automatically generate distractors equation(s) when appropriate.

In one embodiment, the DEM 404 can dynamically determine or recognize a variable as a DQT author 402 is typing in the question text. In some embodiments, the DEM 404 may highlight a word, suggesting that the lighted word may be a variable. Appropriate constraints for that variable may be determined and displayed to the DQT author 402. This can save time for the DQT author. The DEM 404 can dynamically show a question generated from the DQT that the DQT author 402 is working on and allow the DQT author 402 to view a unique question variant (UQV) by a single click of a button. In some embodiments, the DEM 404 treats each variable as an object. Consequently, the DEM 404 can allow the DQT to call an object inspection tool and view attributes of the object (e.g. vehicle maximum velocity in a physics question).

Example DEM features and components will now be described in detail below.

Advantageously, the DEM 404 may mask the complexity of an underlying assessment system (e.g., AES 406), an underlying symbolic math system, and/or other simulation systems (e.g., Simulation Engines 414). More particularly, there is a steep learning curve for new DQT authors to learn the features of an AES or symbolic math system used in previous solutions. By masking the complexity of the underlying proprietary system, the DEM 404 can allow a much wider set of people to author DQTs, due to the reduced need to learn specialized programming languages (e.g., Mathematica, Maple, SAGE, etc.) and data formatting languages (e.g., HTML, MathML, XML, LaTeX, etc.). By providing an intuitive, streamlined method of specifying math equations inside the DEM 404, the DQT author 402 can become effective sooner. The DEM 404 can translate the DQT's mathematics into whichever computer math system languages are required by the underlying AES. Similarly, a DQT author 402 may want to specify details of the formatting of the generated questions. Previously, this specification might require the DQT author 402 to learn and master one or more data formatting languages. By providing a generic means for formatting the generated UQVs, the DEM 404 can avoid the problem of having the DQT author 402 learn special formatting languages or tools.

In addition, by performing convenience operations within the DEM 404, embodiments reduce the number of operations a DQT author must perform in order to create or modify a DQT. The DEM 404 can provide the equivalent of a macro-operation, which allows the DQT author to perform a set of operations over a large set of questions. For example, if a DQT author 402 needs to modify 150 DQTs so they use metric units rather than English units, a component could store a sequence of modifications to one DQT as a macro, which the author could then perform across the other 149 DQTs automatically. Similarly, a common equation library (CEL) component of the object library 418 could store libraries of frequently-used equations such as Maxwell's Equations (differential equations of electrodynamics) so that these equations can be referred to across a large number of DQTs without the need to separately copy/paste the differential equations into each DQT.

The QA Tools 412 perform quality assurance tests on the DQT to flag potential errors in the DQT to the DQT author 402. Thus, embodiments can reduce the number of errors created in DQTs. This can further reduce student frustration and reduce instructor time examining assessment results that have possibly erroneous scores.

Additionally, since one goal of a DQT is to generate a variety of UQVs, the DEM 404 can assist the DQT author 402 by estimating the number of UQVs that can be generated from a given DQT based on the number of variable constraints defined within the DQT. The DEM 404 can also provide graphical visualization aides to help the DQT author 402 understand the multi-dimensional space that represents the population of UQVs which can be generated from the DQT, given the currently-defined variable constraints. For example, if the problem is over-constrained, there may not be many UQVs generated. If the problem is under-constrained, there may be unintended or erroneous UQVs created, which result in students being presented questions that allow for wrong answers to be treated as correct, or correct answers to be treated as incorrect.

In some embodiments, the DEM 404 can also generate samples of the UQVs to estimate the runtime required to generate a UQV. Since it is desirable to generate UQVs 'on the fly', a set of calculations that take several seconds to generate would result in an assessment system 406 performance for students that was unacceptably slow. Finally, the DEM 404 can offer debugging features that allow a DQT author 402 to determine what aspect of a faulty DQT specification produced an erroneous UQV.

The hint generator 420 may provide hints to DQT authors 402 on various ways to improve their DQTs. By providing hints to the DQT author 402, embodiments can assist DQT authors to create better assessment questions, particularly for novice DQT authors. Specifically, the DEM 404 may operate to examine the equation(s) embedded within a DQT and suggest more efficient ways of specifying those equations to reduce the system load and runtime required to generate a UQV from the given DQT. The DEM 404 could also examine the text of the question within a DQT and suggest ways to reword the question to match an assessment style guide. For example, the DEM 404 could indicate that too few female names are being used within a library of DQTs compared with the number of male names being used. The DEM 404 could also enforce a given output question style, for example by enforcing the requirement that all math variables that appear in a question be formatted in italics.

In some embodiments, the libraries, such as Object Library 418 may allow DQT authors to conveniently search through libraries of DQT components. Embodiments can save time for DQT authors by reducing the amount of new code they need to develop within a DQT and reduce the amount of duplicate code that must be replicated within a number of related DQTs.

Because most technical questions involve the use of math to answer the question, a DQT author 402 may need to embed within a DQT the equation(s) required to calculate the correct answer to the question. By storing a library 418 of previously-entered formulas, the DEM 404 can allow the DQT author 402 to search for the formulas they need, possibly save the DQT author 402 the time of re-entering the formulas themselves.

Whenever a DQT author 402 needs to enter a formula into an equation, embodiments of the DEM 404 may offer the DQT author 402 the option of adding that formula into the library for future re-use by other DQT authors. For example, the DEM 404 could provide a library of electrical circuits for use in questions involving electrical circuits, or a library of chemical structures for questions involving chemistry. The DEM 404 could also allow a DQT author 402 to select graphical images to include within the DQT, when the DQT needs to refer the student to an image to explain the problem being addressed in the question. This image library may function like a clip-art library for use by question authors. The DEM might also embed graphics editing tools so that the DQT author could modify the image to suit the needs of their specific DQT. Just as a library of formulas or images, formulas, circuits, chemicals, etc. could be used to assist the DQT author, a library of rules for the generation of false answers in multiple-choice questions (known as 'distractors') could assist the DQT author in creating multiple-choice questions. A library of pre-defined hints or explanation text might assist the DQT author in creating hints or explanations within DQTs. A library of pre-defined constraint values could also assist the DQT author. For example, if a variable named WaterTemperature' is defined within a DQT, the DEM might suggest that a good range for that variable constraint might be from 32 degrees to 212 degrees Fahrenheit.

In some embodiments, the simulation engine 414 allows a DQT author to easily and conveniently access more than one simulation system. The DEM 404 can be configured to support multiple symbolic math systems such as those discussed above, as well as software simulation tools or engines such as Spice, ANSYS, etc. to assist in the programming of DQTs and the grading of the resulting UQVs that are generated by the AES. This allows the DEM 404 to utilize the best features of each tool within a single DQT and reduce possible logic errors. For example, instead of programming all of the electrical equations required to create a DQT concerning a student's ability to measure the voltage difference between two given points within an electrical circuit, the DQT can refer to a circuit simulation software package that calculates the correct answer, saving the programmer from having to embed math formulas that already exist within the circuit simulation tool.

In some embodiments, an expert agent 422 may be provided that may interact with one or more of the other modules to assist in authoring questions and, in some embodiments, assist in converting pre-existing "static" questions into DQVs in accordance with embodiments. In particular, the expert agent 422 may interact with the hint generator 420 and the rules-based engine 416 to provide hints or variants based on an examination of one or more questions and/or constraints input by the user.

For example, the expert agent 422 may examine a static question and suggest elements of the question that might be made into question variables. In some embodiments, the expert agent 422 is configured to parse the text of a question (including for example any mathematical equations or chemical formulae they contain), and identify elements of the question that might be transformed into variable information within the question.

In some embodiments, the expert agent 422 is configured to parse a set of natural language elements. An expert system based on the rule-based-engine 416 or other technique(s) may examine the information within a question and suggest one or more elements of the question that could be converted from a constant into a variable. The DQT author 402 could then check off one or more of the suggested changes, and the testing system would then create a variable element in the DQT. In some embodiments, the expert agent 422 is configured to suggest reasonable values for the constraints on a DQT variable. In some embodiments, the expert agent 422 is configured to offer potential formulas for determining the correct answer to the DQT question, based on a knowledge base of math, science, and engineering subjects. For creating DQTs for multiple-choice questions, in some embodiments, the expert agent 422 is configured to suggest frequently-made student errors as the source of potential wrong answers to the question (e.g., forgetting a negative sign within a calculation, or performing math operations in the wrong order, etc.). The expert agent 422 might also suggest editorial changes to the question wording, or to ensure consistency of wording, grammar, etc. across a set of related DQTs, or enforce a 'style guide' for DQTs.

The QSL interface 410 provides a generic representation to interface DQT components and hides the underlying syntax of multiple DQT representations. The QSL interface 410 allows an underlying DQT component to be replaced without requiring that all DQTs that used the old component to be modified to use the specification language required by the replacement component.

Additionally, the QSL interface 410 can free an application developer from needing to learn and use multiple proprietary specification languages in order to access the underlying AES features. For example, the DEM 404 can be configured to convert the text representation of a math equation in QSL into an internal representation used by a symbolic math engine like Mathematica or Maple. More specifically, by writing DQTs to a generic 'meta' interface rather than to the specific proprietary representations, the providers of an assessment system 406 incorporating an embodiment of the DEM 404 can choose to replace underlying components without requiring that all DQTs that reference those components be modified.

It is not necessarily a requirement of the DEM 404 that the DQT author write all of their questions explicitly using QSL as a 'programming language'. As will be discussed in greater detail below, the user interface can be graphical, wizard-based, menu-based, etc., and use QSL as an internal representation that is partially or fully invisible to a DQT author. The QSL can act as an intermediate representation of the question, and then an embodiment of the DEM 404 can include translator(s) to translate this internal QSL representation into whatever proprietary representation is required by the tools within the assessment system 406. For example, a math formatting declaration defined in QSL could be translated into MathML, or into LaTeX as needed. However, internally the question can be stored within the DEM 404 in a more portable, generic format of QSL. If an assessment system 406 needs to import a large number of existing questions via the DEM 404, those questions could be externally produced in QSL as text, and that text file could be easily imported into the DEM 404 and stored without a large amount of further manual processing.

Figure 5:
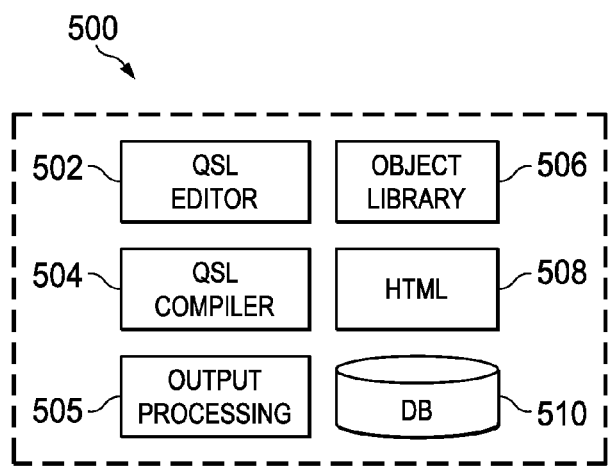
FIG. 5 depicts a diagrammatic representation of an integrated development environment.

FIG. 5 schematically illustrates an integrated development environment 500 for question authoring and template generation using a Query Specification Language in accordance with embodiments. As shown, the integrated development environment 500 includes a QSL editor 502 for receiving questions including related constraints authored by an author. In some embodiments, the QSL editor 502 may include a graphical user interface (GUI) that includes a question authoring wizard and other components. For example, shown in FIG. 6 is a user interface 600 that may allow a user to generate a question. In the example illustrated, the interface 600 includes question template 602, variables 604, and constraints 606. Solution equations 608 and a generated question example 610 are also shown.

Figure 7:
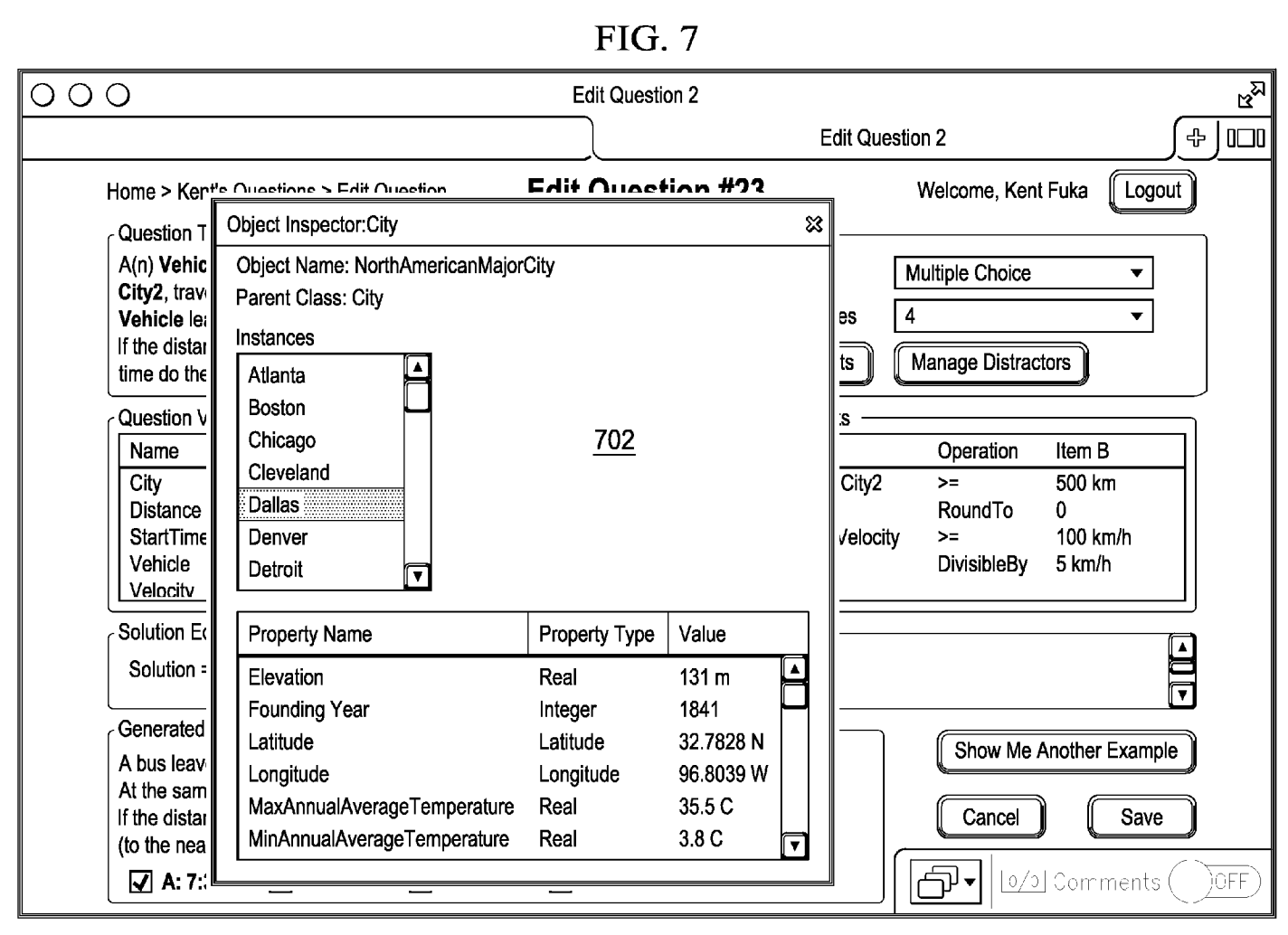

Similarly, the interface of FIG. 7 shows an example of an object 702 that can be used in the generation of the question of FIG. 6. In the example illustrated, the object is a "city" object and can include various properties that may be useful in generating questions or variants and constraints. In other embodiments, the QSL editor 502 may comprise a text editor capable of receiving user-authored questions and constraints directly in the Query Specification Language.

An example of a query in the QSL is set forth below:
question $Q000012;
setting $version "1.4";
variable $width integer;
variable $format1 string;
variable $format2 string;
variable $format3 string;
variable $format4 string;
variable $solution real;
variable $distractor1 real;
variable $distractor2 real;
variable $distractor3 real;
constraint $width {$width>=38; $width<=48;};
solution correct_answer {$solution=$format1;};
solution distractor1 {$distractor1=$format2;};
solution distractor2 {$distractor2=$format3;};
solution distractor3 {$distractor3=$format4;};
language "eng";
statement "A neighborhood rec center has a basketball court that is 84 feet long and 50 feet wide. The center wants to build a second basketball court, but space is limited. If they build a basketball court that is $width feet wide, how many feet long must it be so it is similar in shape to the original basketball court? Round your answer to the nearest tenth of a foot.";
explanation correct_answer
  "Similar figures have the same ratio for each pair of corresponding sides. Make a ratio of the two widths $M[$width/50], and multiply this by the length, 84 feet, in order to determine how long the smaller similar court must be.";
explanation distractor1
  "You did not use the ratio correctly. Instead of subtracting it from the length of the full court, you should multiply the ratio and the length of the full court.";
explanation distractor2
  "You must find the ratio of the widths, which involves dividing the smaller width by the larger and multiplying by the length, not addition and subtraction.";
explanation distractor3
  "The ratio you need is $M[$width/50], but you incorrectly used the inverse. The length of the practice court needs to be smaller than the length of the original court."; explanation general_hint1
  "Determine the ratios of the widths and the lengths.";
explanation general_hint2
  "Does your answer make sense? Is the length of the practice court smaller than the length of the original court?";
explanation format1
  "$Meval[(84)*($width/50)*1.0] feet";
explanation format2
  "$Meval[(84)−($width/50))*1.0] feet";
explanation format3
  "$Meval[(($width)+(84-50))*1.0] feet";
explanation format4
  "$Meval[(84)*(50/$width)*1.0] feet";
tags {"similar figures", "rectangle", "ratio", "proportions"};
end_language;
end_question;

The QSL compiler 504 parses the entered query and performs constraint processing on the query. The compiler 504 may also translate the query into a Mathematica or other suitable language format.

The output processor 505 may receive the resulting compiled query as well as objects from the object library (if any) and generate an html output 508 as well as a an output, e.g., in JSON format, to database 510. The html output may be used by an author to review the question, while the JSON output may be stored as the template in the database 510.

FIG. 8 is an example of an html preview according to an embodiment. In the example illustrated, two question variants are shown, along with associated correct answers and distractors.

An example of a corresponding JSON output is set forth below:

```
{
"name": "Q000012",
"version": "1.4",
"seed": "496",
"questions":[
{
"text": "A neighborhood rec center has a basketball court that is 84 feet long and 50 feet wide. The center wants to build a second basketball court, but space is limited. If they build a basketball court that is 43 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>72.2</mn></math>feet",
"discussion": "Similar figures have the same ratio for each pair of corresponding sides. Make a ratio of the two widths<math xmlns='http://www.w3.org/1998/Math/MathML'><mfrac><mrow><mn>43</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.1</mn></math>feet",
"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>77.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>97.7</mn></math>feet",
"discussion": "The ratio you need is <math xmlns='http://www.w3.org/1998/Math/MathML'><mfrac><mrow><mn>43</mn></mrow><mrow><mn>50</mn></mrow></mfrac></math>, but you incorrectly used the inverse. The length of the practice court needs to be smaller than the length of the original court."
}
]
},
{
"text": "A neighborhood rec center has a basketball court that is 84 feet long and 50 feet wide. The center wants to build a second basketball court, but space is limited. If they build a basketball court that is 39 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>65.5</mn></math>feet",
"discussion": "Similar figures have the same ratio for each pair of corresponding sides. Make a ratio of the two widths<math xmlns='http://www.w3.org/1998/Math/MathML'><mfrac><mrow><mn>39</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.2</mn></math>feet",
"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>73.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>107.7</mn></math>feet",
"discussion": "The ratio you need is <math xmlns='http://www.w3.org/1998/Math/MathML'><mfrac><mrow><mn>39</mn></mrow><mrow><mn>50</mn></mrow></mfrac></math>, but you incorrectly used the inverse. The length of the practice court needs to be smaller than the length of the original court."
}
]
},
{
"text": "A neighborhood rec center has a basketball court that is 84 feet long and 50 feet wide. The center wants to build a second basketball court, but space is limited. If they build a basketball court that is 44 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>73.9</mn></math>feet",
"discussion": "Similar figures have the same ratio for each pair of corresponding sides. Make a ratio of the two widths<math xmlns='http://www.w3.org/1998/Math/MathML'><mfrac><mrow><mn>44</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.1</mn></math>feet",
```

"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>78.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>95.5</mn></math>feet",
"discussion": "The ratio you need is <math xmlns='http://www.w3.org/1998/Math/MathML'><mfrac><mrow><mn>44</mn></mrow><mrow><mn>50</mn></mrow></mfrac></math>, but you incorrectly used the inverse. The length of the practice court needs to be smaller than the length of the original court."
}
]
},
{
"text": "A neighborhood rec center has a basketball court that is 84 feet long and 50 feet wide. The center wants to build a second basketball court, but space is limited. If they build a basketball court that is 47 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>79.0</mn></math>feet",
"discussion": "Similar figures have the same ratio for each pair of corresponding sides. Make a ratio of the two widths<math xmlns='http://www.w3.org/1998/Math/MathML'><mfrac><mrow><mn>47</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.1</mn></math>feet",
"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>81.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>89.4</mn></math>feet",
"discussion": "The ratio you need is <math xmlns='http://www.w3.org/1998/Math/MathML'><mfrac><mrow><mn>47</mn></mrow><mrow><mn>50</mn></mrow></mfrac></math>, but you incorrectly used the inverse. The length of the practice court needs to be smaller than the length of the original court."
}
]
},
{
"text": "A neighborhood rec center has a basketball court that is 84 feet long and 50 feet wide. The center wants to build a second basketball court, but space is limited. If they build a basketball court that is 45 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>75.6</mn></math>feet",
"discussion": "Similar figures have the same ratio for each pair of corresponding sides. Make a ratio of the two widths<math xmlns='http://www.w3.org/1998/Math/MathML'><mfrac><mrow><mn>45</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.1</mn></math>feet",
"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>79.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>93.3</mn></math>feet",
"discussion": "The ratio you need is <math xmlns='http://www.w3.org/1998/Math/MathML'><mfrac><mrow><mn>45</mn></mrow><mrow><mn>50</mn></mrow></mfrac></math>, but you incorrectly used the inverse. The length of the practice court needs to be smaller than the length of the original court."
}
]
},
{
"text": "A neighborhood rec center has a basketball court that is 84 feet long and 50 feet wide. The center wants to build a second basketball court, but space is limited. If they build a basketball court that is 42 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>70.6</mn></math>feet",
"discussion": "Similar figures have the same ratio for each pair of corresponding sides. Make a ratio of the two widths<math xmlns='http://www.w3.org/1998/Math/MathML'><mfrac><mrow><mn>42</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.2</mn></math>feet",
"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>76.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>100.0</mn></math>feet",
"discussion": "The ratio you need is <math xmlns='http://www.w3.org/1998/Math/MathML'><mfrac><mrow><mn>42</mn></mrow><mrow><mn>50</mn></mrow></mfrac></math>, but you incorrectly used the inverse. The length of the practice court needs to be smaller than the length of the original court."
}
]
},
{
"text": "A neighborhood rec center has a basketball court that is 84 feet long and 50 feet wide. The center wants to build a second basketball court, but space is limited. If they build a basketball court that is 46 feet wide, how many feet long must it be so it is similar in shape to the original basketball court? Round your answer to the nearest tenth of a foot.",
"hints":["Determine the ratios of the widths and the lengths.", "Does your answer make sense? Is the length of the practice court smaller than the length of the original court?"],
"answer":{"text": "<math xmlns='http://www.w3.org/1998/Math/MathML'><mn>77.3</mn></math>feet",
"discussion": "Similar figures have the same ratio for each pair of corresponding sides. Make a ratio of the two widths<math xmlns='http://www.w3.org/1998/Math/MathML'><mfrac><mrow><mn>46</mn></mrow><mrow><mn>50</mn></mrow></mfrac></math>, and multiply this by the length, 84 feet, in order to determine how long the smaller similar court must be."
},
"distractors":[
{
"text": "<math xmlns='http://www.w3.org/1998/Math/MathML'><mn>83.1</mn></math>feet",
"discussion": "You did not use the ratio correctly. Instead of subtracting it from the length of the full court, you should multiply the ratio and the length of the full court."
},
{
"text": "<math xmlns='http://www.w3.org/1998/Math/MathML'><mn>80.0</mn></math>feet",
"discussion": "You must find the ratio of the widths, which involves dividing the smaller width by the larger and multiplying by the length, not addition and subtraction."
},
{
"text": "<math xmlns='http://www.w3.org/1998/Math/MathML'><mn>91.3</mn></math>feet",
"discussion": "The ratio you need is <math xmlns='http://www.w3.org/1998/Math/MathML'><mfrac><mrow><mn>46</mn></mrow><mrow><mn>50</mn></mrow></mfrac></math>, but you incorrectly used the inverse. The length of the practice court needs to be smaller than the length of the original court."
}
]
}
]
}

Figure 9:
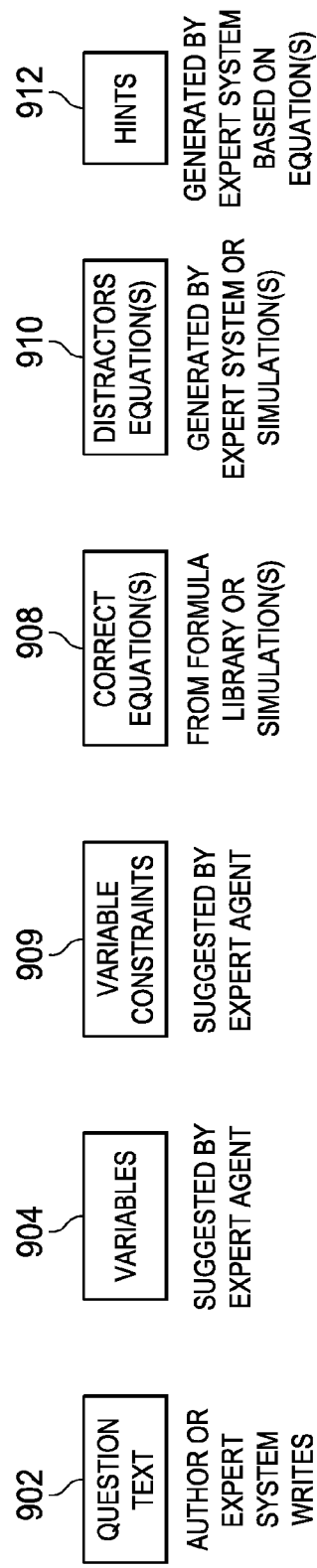
FIG. 9 depicts a diagrammatic representation of expert agent usage in template and question development.

As noted above, in some embodiments, the DEM 404 may include or implement an expert agent 422 that interacts with other elements of the DEM 404 to assist in authoring questions. As illustrated in FIG. 9, having an intelligent agent 422 assist with any or all of these steps can represent a time savings (and probably a cost savings) for the DQT author. For example, as set forth below, the expert agent 422 may estimate the number of unique values for all of the constraint variables in a question, e.g., if the question has two constrained variables $var1 and $var2:
constraint $var1 {$var1>=1; $var1<=15;};
constraint $var2 {$var2>=1; $var2<=15, $var1!=$var2;};
The system will display something like this:
Approximate number of possible values for each variable:
$var1: 15
$var2: 15
Approximate number of variants: 210

For example, as shown at 902, a question author may write a question using the QSL as set forth above. Alternatively, the DEM 404 may be used to scan in a previously written static question and analyzed using the expert agent 422. For example, according to embodiments, the expert agent 422 could assist with recognizing the form of a question given in a source representation, e.g., recognizing that the question is a multiple-choice question, or a fill-in-the blank question. While part of this problem can be address using an Optical Character Recognition (OCR) engine, the higher-level of understanding of the question text requires separating math equations, chemical symbols, charts and graphs, and other question elements from the basis textual part of the question. The expert agent 422 can be configured to take the output of an OCR engine, and identify the components of the question, saving the DQT author from having to specify each portion of the question.

In some embodiments, an expert agent 422 can be configured to convert the text representation of a math equation into an internal representation used by a symbolic math engine like Mathematica or Maple. In some embodiments, the expert agent 422 can be configured to identify a chemical symbolic representation and convert it into an internal representation used by other Chemistry-specific software components in the testing system.

Figure 10:
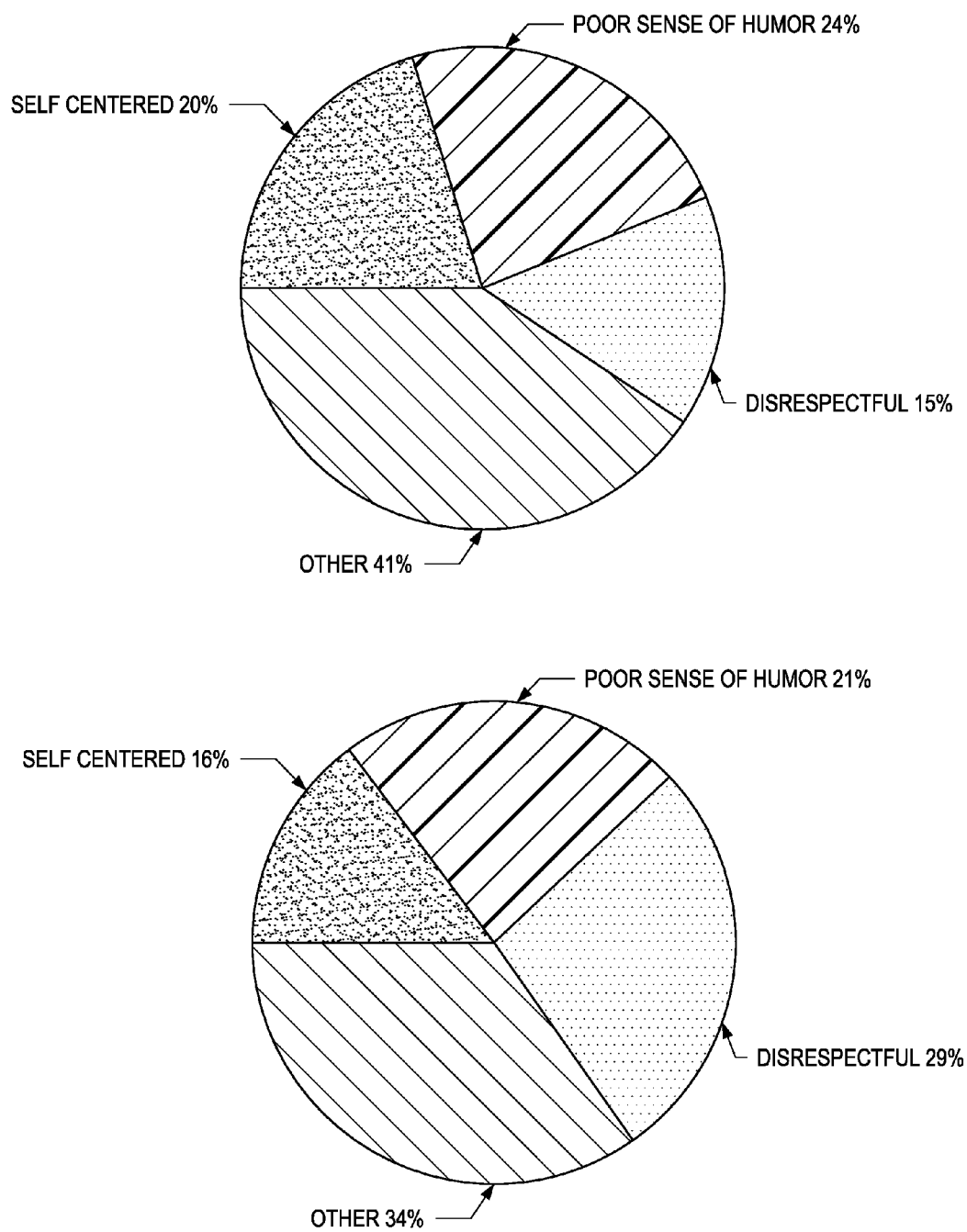
FIG. 10 illustrates example pie charts generated using QSL according to some embodiments.

In some embodiments, an expert agent can be configured to examine charts and graphs in their digital state (e.g., a bitmap image) and recognize the labels on the axes of the charts, which would assist the DQT author if the chart must be re-generated for each unique question variant of a DQT. In some embodiments, the expert agent may generate a unique chart for a UQV using variables specified in the DQT, e.g., a pie chart where the size of the piece slices vary according to variables within the question template. Examples of exemplary pie charts are shown in FIG. 10. QSL language for generating the example of FIG. 10 is set forth below:
question $Q000164;
variable $var integer;
variable $selfcenter integer;

```
variable $humor integer;
variable $disrespectful integer;
variable $other integer;
variable $solution integer;
constraint $var {$var>=4; $var<=14;};
constraint $selfcenter {$selfcenter>=15, $selfcenter<=30;};
constraint $humor {$humor>=15, $humor<=30,
$humor!=$selfcenter;};
constraint $disrespectful {$disrespectful>=15, $disrespect-
ful<=30,
    $disrespectful!=$selfcenter, $disrespectful!=$humor;};
constraint $other {$other=100-$selfcenter-$disrespectful-
$humor,
    $other!=$selfcenter, $other!=$disrespectful,
    $other!=$humor;};
solution correct_answer {$solution=$var*$selfcenter;};
language "eng";
statement "$Graph[PieChart] A group of one hundred teen-
agers at the mall were surveyed and asked what annoyed them
the most about their best friends.
    The results are shown in the pie chart. If the group of one
hundred was a sample from a town with $Meval[$var*100]
total teenagers, predict what total number of teenagers are
likely to be most annoyed by
self-centered ness.";
graphic_variables PieChart {$selfcenter,$humor,$disre-
spectful,$other};
graphic_legends PieChart {
    "Self-centered",
    "Poor sense of humor",
    "Disrespectful",
    "Other"};
end_language;
end_question;
```

The appearance of the $Graph[PieChart] in line 19 determines where the graphic named PieChart is displayed within the generated Unique Question Variants. In this case the graphic is displayed as part of the question's problem statement. In other uses, a graphic might be displayed within a multiple-choice answer or within an answer explanation or a hint. The line that begins 'graphic_variables' specifies which DQT variables are to be included in the pie chart, and in which order. Finally, the section that begins with 'graphic_legends', defines the text displayed for each segment of the pie chart.

Returning to FIG. 9, as shown at 904, in some embodiments, the expert agent 422 can be configured to examine the internal representation of a math equation and suggest which elements of the equation might be converted into a variable in the DQT. For example, when presented with a formula like $f(x)=6x^2+4x-8$, the expert agent 422 could identify that 'x' might be a variable element (which might be varied to 'y' or 'z', etc.), and that '6', '2', '4' and '8' might each be varied by the DQT. The expert agent 422 could also identify that the '+' and the '−' in the formula could be switched from '+' to '−', and vice versa. Thus, a variant of the DQT might become $f(y)=8y^4-2y+4$, if all elements of the equation were made variable. The DQT author 402 would then merely need to check-off which subset of these formula elements they wish to become variables in the final DQT, or they might allow the expert agent to pick some subset of the possible variables (e.g., pick 2 elements to vary, and leave the other elements unchanged in the DQT.)

In some embodiments, the expert agent 422 can be configured to examine the internal representation of a chemical equation, or a physics equation, or an engineering equation, and suggest elements which might be modified. For example, in a pre-existing (static, non-DQT) physics question involving 5 newtons of force, an expert agent might suggest that the '5' become a variable, and that the constrained range of that variable be from 1 newton to 10 newtons.

As shown at 906, when DQT authors 402 are writing new dynamic questions from scratch, they can enter their equation in some simple format (e.g., from a keyboard), and the expert agent 422 can be configured to highlight those elements of the equation that might be considered to be a variable element as the author is typing. More specifically, the expert agent 422 may parse the question 'on the fly' as it is being entered, attempt to recognize the various elements of the question and, where appropriate, dynamically propose improvements and/or suggest variable elements.

When questions are multiple choices, the DQT author 402 may need to specify how the testing system calculates the correct answer, and may specify ways to generate false answers (known as distractors). In some embodiments, a pre-defined object library 908 of math, science, and engineering equations can simplify this process for a DQT author. However, a trained question author may employ some techniques to generate plausible distractors as some or all of the 'distractor' wrong answers for a multiple choice question. In some embodiments, the expert agent 422 can be configured to mimic the work of a trained question author by employing common student faults to generate plausible wrong answers, as shown at 910. Such an expert agent would know, for example, that students often perform operations in an equation in the wrong order, and would operate to make those same errors to generate a synthetic wrong answer. In some cases, the expert agent 422 may make use of the knowledge contained in the math, science and engineering object library of equations 418 to generate synthetic wrong answers by applying the wrong equation to solve a problem. The expert agent 422 may also miss-convert units like mass, velocity, temperature, etc. to generate a synthetic 'distractor' answer with the wrong units of measure. Finally, when generating multiple choice answers, the expert agent 422 could constrain the possible correct and incorrect answers within a range of answer lengths, for example, so that the correct answer is not significantly longer/shorter than or more-complex/less-complex than the alternative answers.

In some embodiments, the expert agent 422 can be configured to act as a trained question editor, enforcing a library of style rules for DQTs. For example, as shown at 912, a DQT editor expert agent 422 may interact with the hint generator 420 to suggest clearer question wording, or provide hints about providing a correct answer. As a specific example, an expert agent 422 may be configured to remind a DQT author 402 that the question should tell the student to round their answer appropriately, or to include the units of measure in their answer.

In some embodiments, the expert agent 422 can be configured to act as a style guide. When multiple question authors are collaborating on a set of DQTs, such a style guide expert agent may enforce organization rules, e.g., about the selection of names in word problems (Mary, John, Jose, Shamiquah, etc.) to avoid gender bias, economic bias, racial bias, as well as question phrasing rules (e.g., use of 'shall', 'must', 'should', etc.).

In some embodiments, the expert agent 422 can be configured to detect instances of question plagiarism or excessive similarity. For example, when a DQT author authors a question, an expert agent 422 may search existing stocks of questions and notify the DQT author (or their management) about other questions that already contain largely the same information.

In some embodiments, an expert agent 422 can be configured to act as an expert editor for human DQT authors. In some embodiments, an expert agent (or a collection of expert agents) may be configured to completely automate the transformation of existing static questions (perhaps scanned from existing textbooks or sample printed exams) into fully-dynamic DQTs without human intervention.

In some embodiments, the expert agent 422 may be given access to a library of equations for a math, science, engineering or technology knowledge base (e.g., the object library described herein) and generate a set of DQTs (or static questions) automatically to determine a student's mastery of the knowledge represented by those equations. For example, given the knowledge of the equations behind Isaac Newton's first law of motion, the expert agent 422 may generate a variety of questions that, when answered correctly, will demonstrate that student's knowledge and understanding of Newton's first law of motion. Various expert agents 422 can be configured to generate a variety of question types, including true/false, multiple-choice, fill-in-the-blank, short answer, and graphical questions (like 'draw a plot diagram' questions), etc.

In some embodiments, for both DQT authors 402 and students 408 using the resulting variable questions generated from a DQT, an expert agent 422 could be configured to work out the steps required to solve a multiple step solution to one or more related questions, and assist in generating and grading questions that require students to show their work. This would allow the expert agent to give DQT authors and students immediate feedback on whether the sequence of steps in their work is correct.

In some embodiments, for students answering assessment questions, an expert agent could be configured to review their work and their answers, and suggest dynamic assistance (e.g., hints, help, prerequisite remedial lessons, etc.) based on the details of the variable question the student is answering. In some embodiments, the expert system may interface to a third-party lesson recommendation engine like Knewton. Existing systems offer only general tips when students get answers wrong, and these are normally static text. An expert agent-based system could offer dynamic hints that incorporate variable information, and which are based a particular rules base. For example, if an expert agent determines that a student has answered a question incorrectly because at one step of their calculation they forgot a minus sign, the expert agent could offer a reminder to check their minus signs in, say, Step #4. Similarly, if the system determined that the student used seconds rather than hours to calculate a problem involving time, the expert agent could offer the student a unique hint to check their units of measurement of time.

For many instructors and educational publishers, there is a desire for testing solutions that require students to 'show their work'. While it is possible for systems to record a student's intermediate work in arriving at an answer, an expert agent could be configured to evaluate the steps involved in the intermediate work and quickly identify any missteps prior to the student entering their final answer. This can help students avoid incorrect answers, and help instructors automate the grading of student work that contains intermediate steps. Because the expert agent has access to a symbolic math engine and other simulation tools, the expert agent can use this expert knowledge to evaluate the intermediate steps of a solution and determine whether each step N is correct given the prior steps.

Figure 11A:
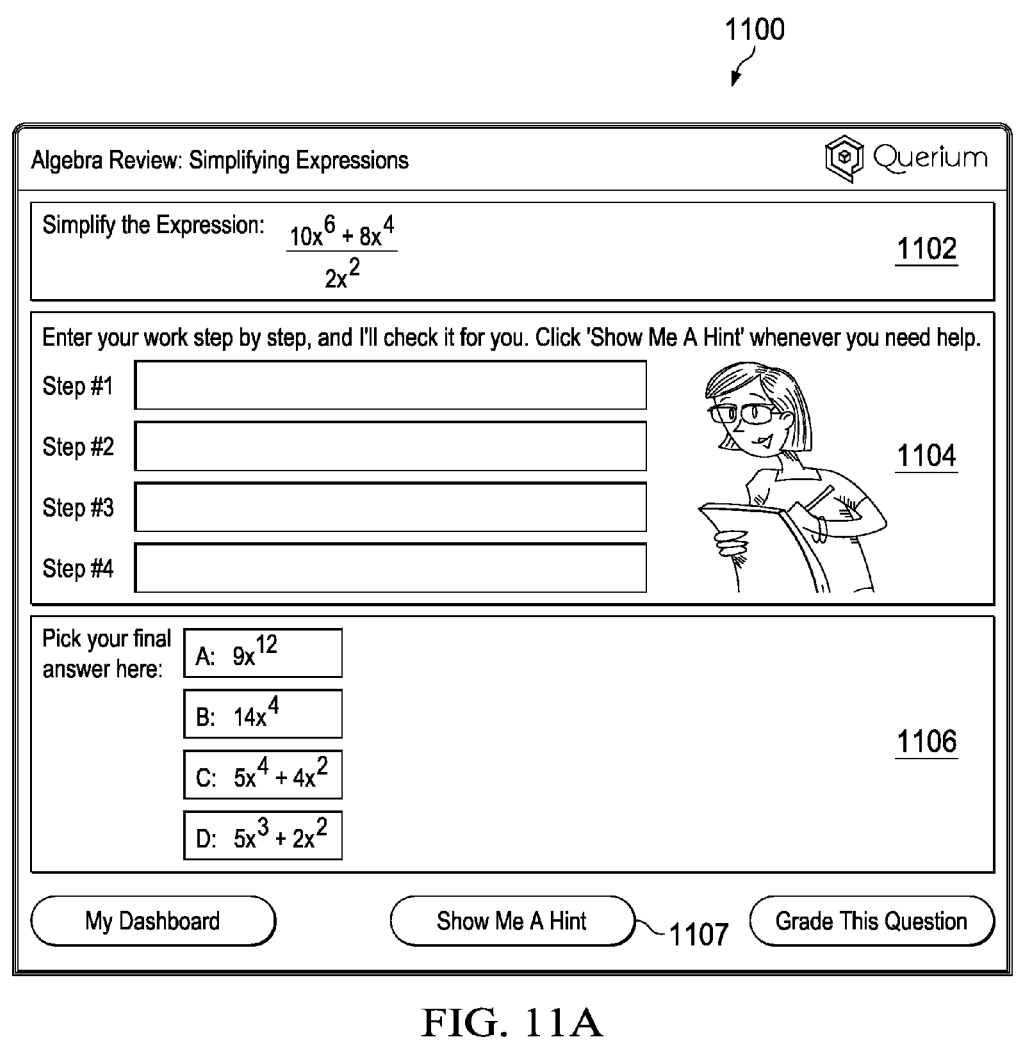
Figure 11B:
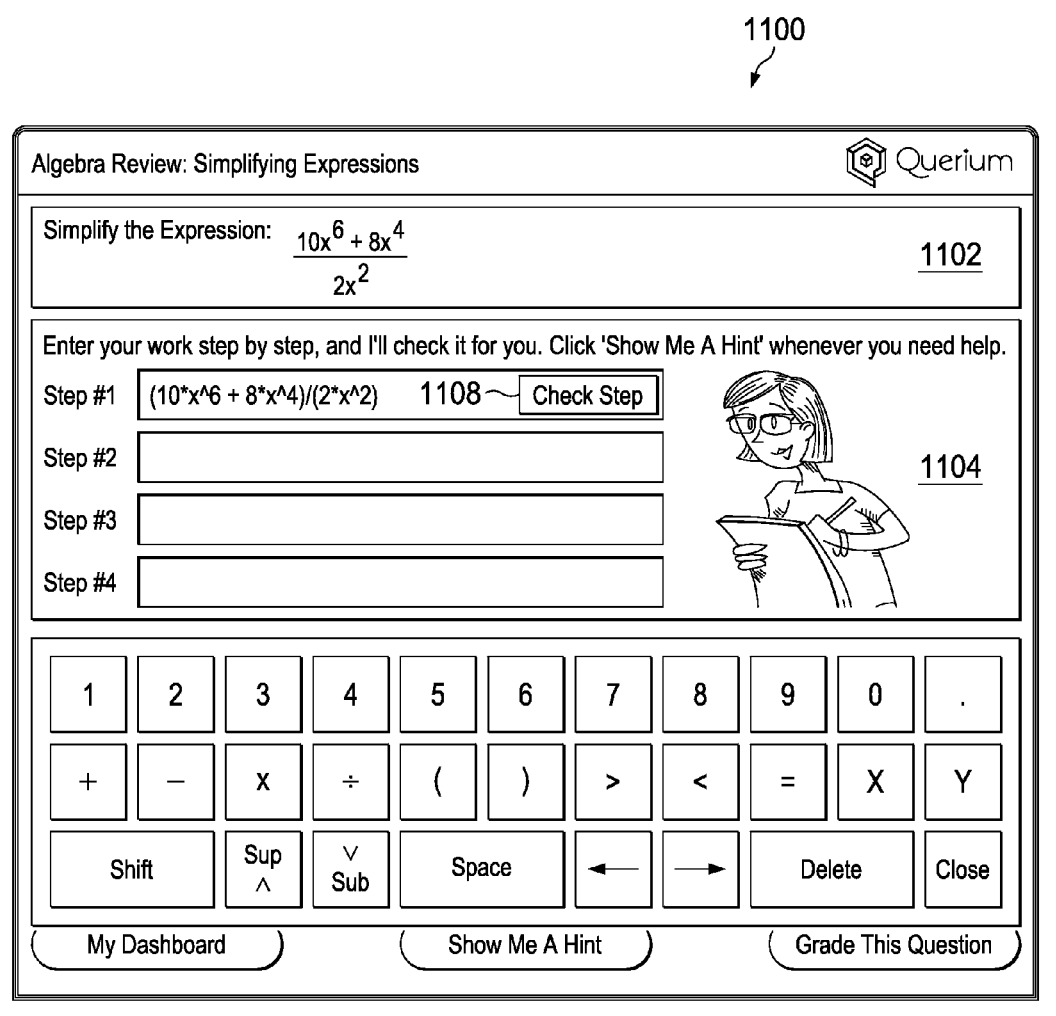
Figure 11C:

An example of this is shown with reference to FIG. 11A-FIG. 11E. Shown in FIG. 11A is an interface 1100 showing an example question 1102 requiring the student to simplify an algebraic expression. In the example illustrated, the interface 1100 includes a solution entry section 1104, a final answer selection section 1106, and a hint request control 1107.

As shown in FIG. 11B, the student may enter a step in solution entry section 1104 and select a control 1108 to check the step (i.e., evaluate it for error). The student may then be allowed to enter a next step in the solution entry section 1104 and likewise check the correctness of the step. If it is not correct, as shown in FIG. 11C, via the designation "Not Quite," the user may be enter a more correct answer.

Figure 11D:
Figure 11E:
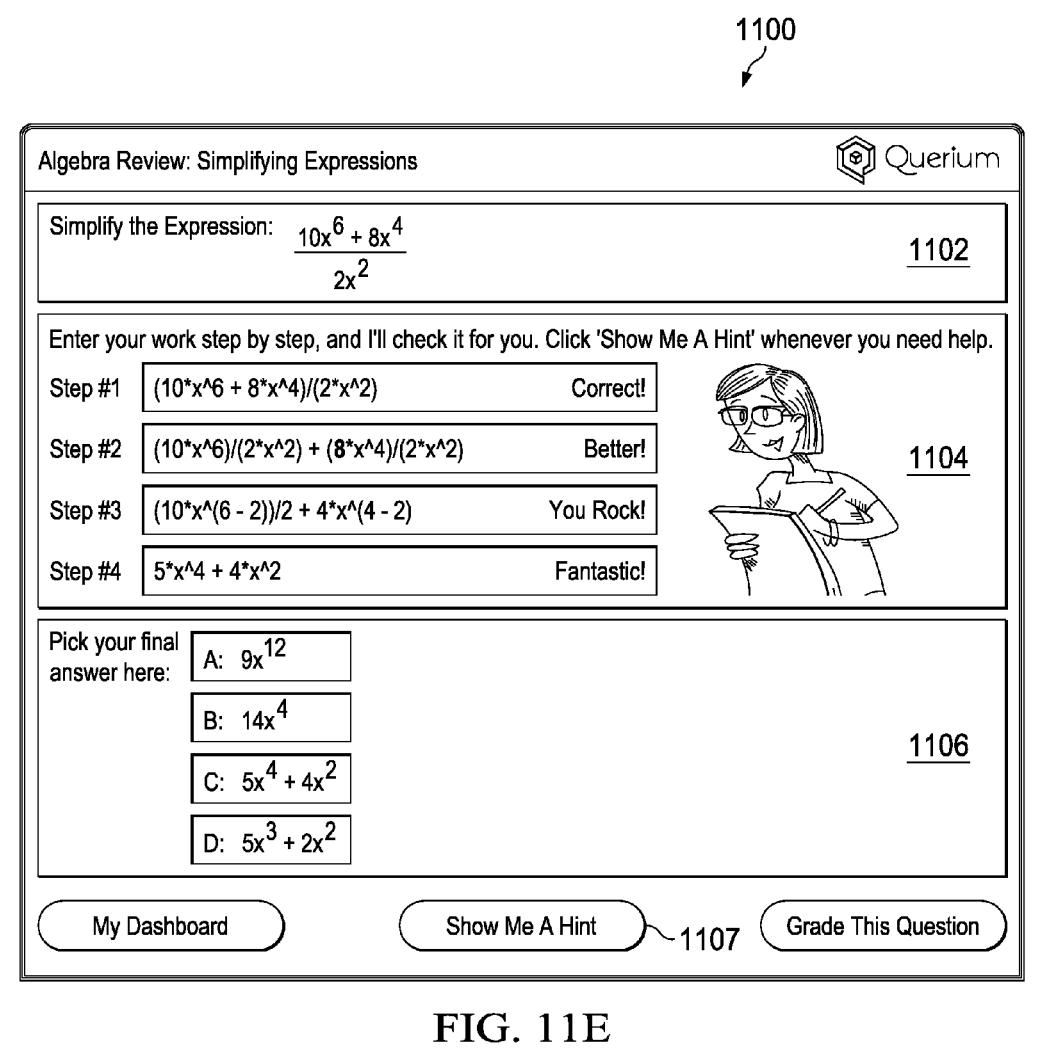

In addition, the user may select the hint button 1107 to be provided with a hint, such as hint 1110 as shown in FIG. 11D and may then correct his answer. In some embodiments, the student may be allowed to select the hint button 1107 additional times for additional hints. Finally, as shown in FIG. 11E, the correct answer is obtained. The user may then select the correct final answer from section 1106. In some embodiments, if the user needed hints, he may be provided with one or more other question variants before proceeding to a next topic.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for generating questions, comprising:
    providing a user interface or a text editor on a client device for a user to compose a dynamic question template in a first representation of a human readable language;
    receiving from the client device by a system running on one or more server machines the dynamic question template in the first representation, the dynamic question template having a question, question variables, and question constraints, with or without a correct answer;
    the system checking the dynamic question template in the first representation for syntax errors according to a query specification language and enabling correction of any syntax error found by the system;
    the system compiling the dynamic question template from the first representation into a second representation of a first machine readable language supported by a symbolic math engine;
    the system generating a dynamic question template object of a second machine readable language supported by an object library of the system based at least on the compiled dynamic question template in the first machine readable language, the dynamic question template object including one or more predefined objects from the object library, the generating including:
        determining whether the question constraints are sufficient to produce a plurality of unique question variants;
        suggesting at least one change or enhancement to the question; or
        a combination thereof;
    the system running one or more simulations of the question; and
    the system generating a plurality of unique question variants using the dynamic question template object and output from the one or more simulations without further input from the user to thereby improve computer based question generation technologies, wherein each of the plurality of unique question variants comprises a unique variation of the question text incorporating a unique combination of values for the question variables as constrained by the question constraints.

2. The method according to claim 1, wherein the first representation is a question specification language and wherein the second representation is used by the symbolic math engine.

3. The method according to claim 1, wherein the system obtains the values for the question variables from the object library.

4. The method according to claim 3, wherein the object library comprises one or more equations for solving the question.

5. The method according to claim 1, further comprising:
    determining a number of the plurality of unique question variants that can be generated based on the question, the values for the question variables, and the question constraints.

6. The method according to claim 1, further comprising:
    providing one or more hints associated with the question to the user at the client device via the user interface.

7. The method according to claim 6, wherein the one or more hints are determined by the system without input from the user.

8. The method according to claim 1, further comprising:
    for each of the plurality of unique question variants, generating a plurality of possible answers, wherein the plurality of possible answers comprises the correct answer and at least one incorrect distractor answer not specified in the dynamic question template.

9. The method according to claim 1, wherein the generating is dynamically performed in response to a request received at the system.

10. The method according to claim 1, wherein the generating is performed independently of a request received at the system.

11. The method according to claim 1, further comprising:
    the system determining whether the question constraints are reasonable in view of the question or whether the question constraints are sufficient for producing a reasonable number of unique question variants given the question; and the system suggesting to the user, via the user interface, changes or enhancements to the question if the question constraints are not reasonable in view of the question or if the question constraints are insufficient for producing a reasonable number of unique question variants given the question.

12. A system for generating questions, comprising:
at least one processor; and
at least one non-transitory computer readable medium storing instructions translatable by the at least one processor to perform:
providing a user interface or a text editor on a client device for a user to compose a dynamic question template in a first representation of a human readable language;
receiving from the client device the dynamic question template in the first representation, the dynamic question template having a question, question variables, and question constraints, with or without a correct answer;
checking the dynamic question template in the first representation for syntax errors according to a query specification language and enabling correction of any syntax error found by the system;
compiling the dynamic question template from the first representation into a second representation of a first machine readable language supported by a symbolic math engine;
generating a dynamic question template object of a second machine readable language supported by an object library of the system based at least on the compiled dynamic question template in the first machine readable language, the dynamic question template object including one or more predefined objects from the object library, the generating including:
   determining whether the question constraints are sufficient to produce a plurality of unique question variants;
   suggesting at least one change or enhancement to the question; or
   a combination thereof;
running one or more simulations of the question; and
generating a plurality of unique question variants using the dynamic question template object and output from the one or more simulations without further input from the user to thereby improve computer based question generation technologies, wherein each of the plurality of unique question variants comprises a unique variation of the question text incorporating a unique combination of values for the question variables as constrained by the question constraints.

13. The system of claim 12, wherein the first representation is a question specification language and wherein the second representation is used by the symbolic math engine.

14. The system of claim 12, wherein the values for the question variables are obtained from the object library.

15. The system of claim 14, wherein the object library comprises one or more equations for solving the question.

16. The system of claim 12, wherein the at least one non-transitory computer readable medium stores further instructions translatable by the at least one processor to perform:
determining a number of the plurality of unique question variants that can be generated based on the question, the values for the question variables, and the question constraints.

17. The system of claim 12, wherein the at least one non-transitory computer readable medium stores further instructions translatable by the at least one processor to perform:
providing one or more hints associated with the question to the user at the client device via the user interface.

18. The system of claim 17, wherein the one or more hints are determined without input from the user.

19. The system of claim 12, wherein the at least one non-transitory computer readable medium stores further instructions translatable by the at least one processor to perform:
for each of the plurality of unique question variants, generating a plurality of possible answers, wherein the plurality of possible answers comprises the correct answer and at least one incorrect distractor answer not specified in the dynamic question template.

20. The system of claim 12, wherein the generating is dynamically performed in response to a request received at the system.

21. The system of claim 12, wherein the generating is performed independently of a request received at the system.

22. The system of claim 12, wherein the at least one non-transitory computer readable medium stores further instructions translatable by the at least one processor to perform:
determining whether the question constraints are reasonable in view of the question or whether the question constraints are sufficient for producing a reasonable number of unique question variants given the question; and
suggesting to the user, via the user interface, changes or enhancements to the question if the question constraints are not reasonable in view of the question or if the question constraints are insufficient for producing a reasonable number of unique question variants given the question.

23. A computer program product comprising at least one non-transitory computer readable medium storing instructions translatable by at least one processor of a computer to perform:
providing a user interface or a text editor on a client device for a user to compose a dynamic question template in a first representation of a human readable language;
receiving from the client device the dynamic question template in the first representation, the dynamic question template having a question, question variables, and question constraints, with or without a correct answer;
checking the dynamic question template in the first representation for syntax errors according to a query specification language and enabling correction of any syntax error found by the system;
compiling the dynamic question template from the first representation into a second representation of a first machine readable language supported by a symbolic math engine;
generating a dynamic question template object of a second machine readable language supported by an object library of the system based at least on the compiled dynamic question template in the first machine readable language, the dynamic question template object including one or more predefined objects from the object library, the generating including:
   determining whether the question constraints are sufficient to produce a plurality of unique question variants;
   suggesting at least one change or enhancement to the question; or
   a combination thereof;
running one or more simulations of the question; and
generating a plurality of unique question variants using the dynamic question template object and output from the one or more simulations without further input from the user to thereby improve computer based question generation technologies, wherein each of the plurality of unique question variants comprises a unique variation of the question text incorporating a unique combination of values for the question variables as constrained by the question constraints.

24. The computer program product of claim 23, wherein the values for the question variables are obtained from the object library.

25. The computer program product of claim 24, wherein the object library comprises one or more equations for solving the question.

26. The computer program product of claim 23, wherein the at least one non-transitory computer readable medium stores further instructions translatable by the at least one processor to perform:
  determining a number of the plurality of unique question variants that can be generated based on the question, the values for the question variables, and the question constraints.

27. The computer program product of claim 23, wherein the at least one non-transitory computer readable medium stores further instructions translatable by the at least one processor to perform:
  providing one or more hints associated with the question to the user at the client device via the user interface, wherein the one or more hints are determined without input from the user.

28. The computer program product of claim 23, wherein the at least one non-transitory computer readable medium stores further instructions translatable by the at least one processor to perform:
  for each of the plurality of unique question variants, generating a plurality of possible answers, wherein the plurality of possible answers comprises the correct answer and at least one incorrect distractor answer not specified in the dynamic question template.

29. The computer program product of claim 23, wherein the generating is dynamically performed in response to or independently of a request received at the computer.

30. The computer program product of claim 23, wherein the at least one non-transitory computer readable medium stores further instructions translatable by the at least one processor to perform:
  determining whether the question constraints are reasonable in view of the question or whether the question constraints are sufficient for producing a reasonable number of unique question variants given the question; and
  suggesting to the user, via the user interface, changes or enhancements to the question if the question constraints are not reasonable in view of the question or if the question constraints are insufficient for producing a reasonable number of unique question variants given the question.

\* \* \* \* \*